(12) United States Patent
Nishijima (10) Patent No.: US 9,114,825 B2
(45) Date of Patent: Aug. 25, 2015

(54) INPUT DEVICE AND CONTROL SYSTEM OF IN-VEHICLE DEVICE

(71) Applicant: Alps Electric Co., Ltd., Tokyo (JP)

(72) Inventor: Akio Nishijima, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 323 days.

(21) Appl. No.: 13/796,465

(22) Filed: Mar. 12, 2013

(65) Prior Publication Data

US 2013/0239733 A1 Sep. 19, 2013

(30) Foreign Application Priority Data

Mar. 15, 2012 (JP) ................... 2012-059253

(51) Int. Cl.
*B62D 1/04* (2006.01)
*B62D 1/06* (2006.01)

(52) U.S. Cl.
CPC ........ *B62D 1/046* (2013.01); *B62D 1/06* (2013.01); *Y10T 74/20256* (2015.01)

(58) Field of Classification Search
CPC ............ H01H 13/84; H01H 2009/187; H01H 2209/006; H01H 2217/032; H01H 2221/012; H01H 2225/002; H01H 2225/018; H01H 2225/03; H01H 2231/026
USPC ..... 200/5 R, 5 A, 61.54, 61.27, 61.55, 61.57; 74/484 R
See application file for complete search history.

(56) References Cited

U.S. PATENT DOCUMENTS

| 6,104,101 A | 8/2000 | Miller et al. |
| 6,225,578 B1 * | 5/2001 | Kobayashi et al. ........... 200/5 R |
| 6,624,365 B2 * | 9/2003 | Miyako et al. ............ 200/61.54 |

FOREIGN PATENT DOCUMENTS

| CN | 1715093 A | 1/2006 |
| JP | 62-198545 | 9/1987 |
| JP | 2001-143559 | 5/2001 |
| JP | 2008-087566 | 4/2008 |

OTHER PUBLICATIONS

Office Action issued in Chinese Patent Application No. 201310050912.5, mailed Dec. 12, 2014, 13 pages.

* cited by examiner

*Primary Examiner* — Edwin A. Leon
(74) *Attorney, Agent, or Firm* — Brinks Gilson & Lione (57) ABSTRACT

An input device of an embodiment includes a ring portion (operation body) which has a substantially circular cross-section, of which an outer peripheral surface is used as an operation surface, and which is twist-operated in a cross-section circumferential direction thereof, first sensor members to detect operation position information on the operation surface, second sensor members to detect twist information when the twist operation is performed, and a controller to output the operation position information based on electric changes of the first sensor members and the twist information based on electric changes of the second sensor members, in order to control activation of an electronic device.

18 Claims, 9 Drawing Sheets

INPUT DEVICE AND CONTROL SYSTEM OF IN-VEHICLE DEVICE

CLAIM OF PRIORITY

This application claims benefit of Japanese Patent Application No. 2012-059253 filed on Mar. 15, 2012, which is hereby incorporated by reference in its entirety.

BACKGROUND

1. Field of the Disclosure

The present disclosure relates to an input device, for example, of which an operation surface is used as an outer peripheral surface of a ring portion of a steering device, and a control system of an in-vehicle device.

2. Description of the Related Art

Recently, vehicles have become more intelligent, and a variety of input operations are largely performed without regard to being driven, being parked, or the like. In the related art, a plurality of switches is arranged at a position of a spoke portion (steering device pad in Japanese Unexamined Patent Application Publication No. 2001-143559) of a steering device, and a selection/input operation of an electronic device is performed, as disclosed in Japanese Unexamined Patent Application Publication No. 2001-143559 for example.

However, there is a problem in that operability is poor since operations of the switches entail movement of a finger.

On the other hand, in Japanese Unexamined Patent Application Publication No. 62-198545, a plurality of pressure sensors is arranged in a ring portion (ring-shaped structure in Japanese Unexamined Patent Application Publication No. 62-198545) so as to allocate a plurality of functions, and the ring portion is pressed and a pressure is detected by the associated pressure sensor which is at the pressed position. Then, a predetermined function is activated based on a signal detected by the pressure sensor.

In the configuration of Japanese Unexamined Patent Application Publication No. 62-198545, there is, however, a problem of tending to cause an operation error since an input operation is made by pressing the ring portion. That is, if the ring portion is firmly grasped, there is a problem in that operation recognition is arbitrarily initiated. In addition, in order to obtain, for example, a volume control function of a car audio in the configuration of Japanese Unexamined Patent Application Publication No. 62-198545, there is a need to individually arrange each of the pressure sensors for turning up the volume and the pressure sensors for turning down the volume along a circumferential direction of the ring portion. Therefore, there is a problem in that it is difficult to allocate multiple input operations on the ring portion. In addition, since a steering device disclosed in Japanese Unexamined Patent Application Publication No. 62-198545 is based on the premise that a switch portion is disposed in a spoke portion and switched on, there is a problem in that it is unable to be completed only by the operation of the ring portion and has poor operability.

In addition, Japanese Unexamined Patent Application Publication No. 2008-87566 is disclosed which disposes a capacitive sensor at an operation region of a ring portion to activate an in-vehicle device. Then, an input operation is not performed in a state in which a hand comes into contact with exclusive regions located at both sides of the operation region.

However, in the configuration of Japanese Unexamined Patent Application Publication No. 2008-87566, an input operation of the in-vehicle device should be performed by picking the operation region with a finger or performing a rotation operation in an isolated state, and an operation separated from a normal driving operation. Moreover, the exclusive regions are at both sides of the operation region, and the operation should be performed so that a hand comes into no contact with the exclusive regions. Accordingly, it may be impossible to obtain good operability.

SUMMARY

An input device includes an operation body of which an outer peripheral surface is used as an operation surface, the operation body being twist-operated in a cross-section circumferential direction thereof; first sensor members of which each detects operation position information on the operation surface by detecting an electric change; second sensor members of which each detects twist information by detecting an electric change when the twist operation is performed; and a controller to output the operation position information and the twist information in order to control activation of an electronic device.

Since the invention obtains both of the operation position information by the first sensor member and the twist information by the second sensor member without moving a finger, it may be possible to achieve good operability. For example, it may be possible to select a specific function of the electronic device based on the operation position information by a position of a hand approaching on a ring portion and execute a selected input operation of the electronic device based on the twist information by the twist operation at a position from which the grasped hand is not removed. Particularly, in the invention, the electronic device may be activated by simple operations such as contact with or proximity to the operation surface and twist thereof, thereby enabling an improvement of operability. In addition, for example, the function of the selected electronic device may be controlled so as not to be activated only in such a manner that the first sensor member acquires the operation position information by only the hand coming into contact with or approaching on the operation surface since the twist operation is required. Consequently, it may be possible to prevent an operation error.

DESCRIPTION OF THE EXEMPLARY EMBODIMENTS

Figure 1:
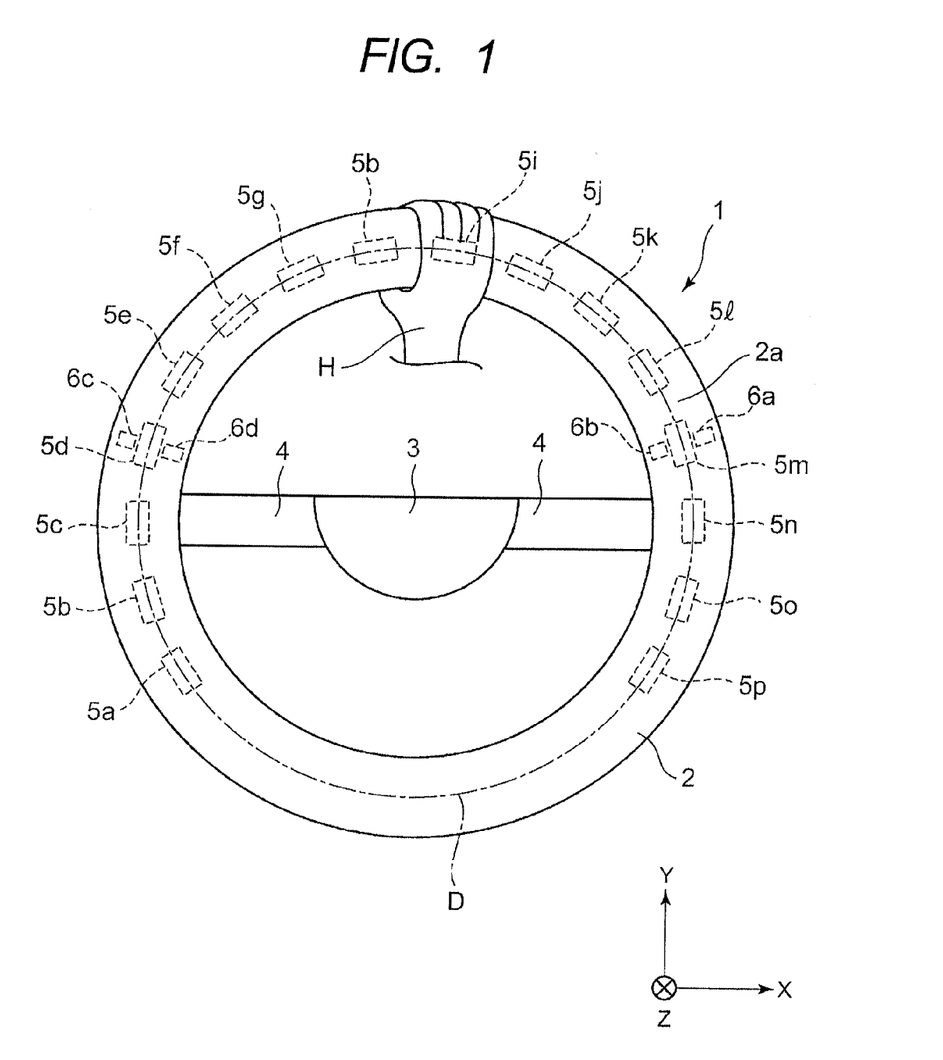
FIG. 1 is a front view of a steering device according to an embodiment, the front view particularly illustrating a state in which a hand comes into contact with a predetermined position on a ring portion.

FIG. 1 is a front view of a steering device according to an embodiment.

The steering device 1 shown in FIG. 1 includes a ring portion (circumference portion) 2 having a substantially circular shape in section, a boss portion 3, and spoke portions 4 and 4 which connects the ring portion 2 to the boss portion 3. The ring portion 2 is a grasp portion (grip portion) during steering.

In the embodiment, the ring portion 2 is also an operation body of an input device to perform a selection/input operation with respect to an in-vehicle device (electronic device).

The ring portion 2 is directed in a planar direction parallel with the X-Y plane shown in FIG. 1. The Z direction is a thickness direction of the ring portion 2. In the specification, line D (indicated by an alternate long and short dash line) of the ring portion 2 on the X-Y plane represents a longitudinal direction of the ring portion 2. In addition, a width direction of the ring portion 2 is a direction perpendicular to the line D on the X-Y plane. Also, a cross-section circumferential direction is an outer circumferential direction along an outer peripheral surface (operation surface) 2a of the ring portion 2 which is represented as a cross-section (see FIG. 3) cut in the thickness direction along the width direction. In addition, the term "operation" refers to an act, such as contact, proximity, or twist, of an operator on the ring portion 2. The term "activation" refers to a state in which the in-vehicle device (electronic device) exhibits and executes a function and the like by the operation result of the operator on the ring portion 2. For example, selecting a volume function of a car audio device and turning up or down the selected volume correspond to the activation of the in-vehicle device.

As shown in FIG. 1, a plurality of first sensor members 5a to 5p is arranged within the ring portion 2 to be spaced with a predetermined interval along the line D. The first sensor members 5a to 5p are to detect operation position information of the operator. In FIG. 1, the respective first sensor members are denoted by reference numerals 5a to 5p. However, when no particular first sensor member is specified below, the description "first sensor members 5" may be used.

Each of the first sensor members 5a to 5p is, for example, a capacitive sensor. For example, a region of each of the first sensor members 5a to 5p configures a touch panel including the capacitive sensor. The arrangement of the first sensor members 5a to 5p is shown in FIG. 1 as an example. The respective first sensor members 5 may also be provided entirely around the line D of the ring portion 2, and the arrangement region of the first sensor members 5 may also be narrower than FIG. 1. In addition, the number and sizes of the first sensor members 5 may be properly changed.

As shown in FIG. 1, second sensor members 6a to 6d are provided at both of a portion grasping the ring portion 2 with a right hand and a portion grasping the ring portion 2 with a left hand, during normal driving. In FIG. 1, the respective second sensor members are denoted by reference numerals 6a to 6d. However, when no particular second sensor member is specified below, the description "second sensor members 6" may be used. The arrangement of the second sensor members 6a to 6d is shown in FIG. 1 as an example. In FIG. 1, the second sensor members 6a to 6d are installed at approximately the 10 o'clock and 2 o'clock positions of a clock face. Alternatively, the second sensor members 6 may be provided at only one of a portion grasping the ring portion 2 with a right hand and a portion grasping the ring portion 2 with a left hand. Alternatively, the installation range of the second sensor members 6 may also be a wider range (see FIG. 7 described later) than FIG. 1. In addition, the number of the second sensor members 6 may be properly changed.

Each of the second sensor members 6 is to detect twist information of the ring portion 2, and is thus configured by a strain sensor or a pressure sensitive sensor for example.

Figure 2:
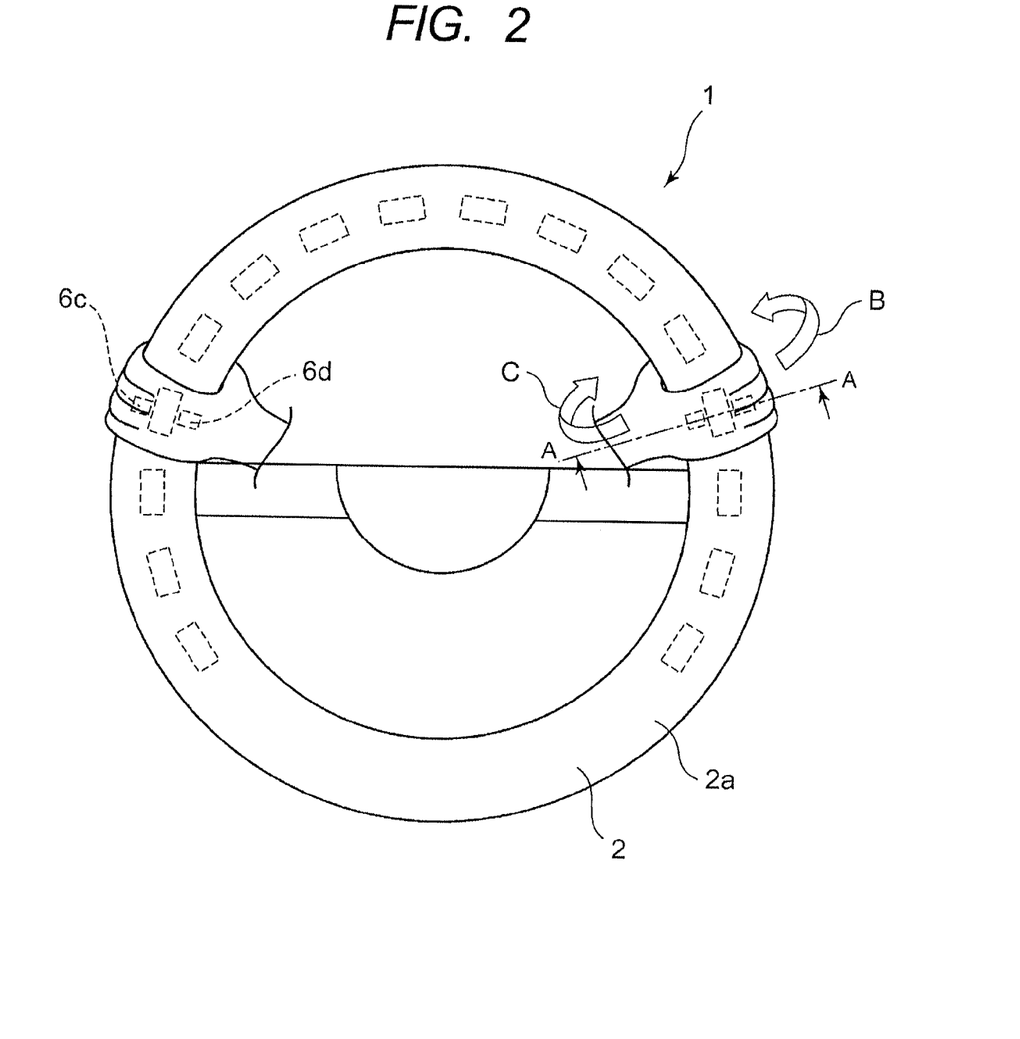
FIG. 2 is a front view of the steering device according to the embodiment, the front view particularly illustrating a state in which the ring portion is twist-operated.
Figure 3:
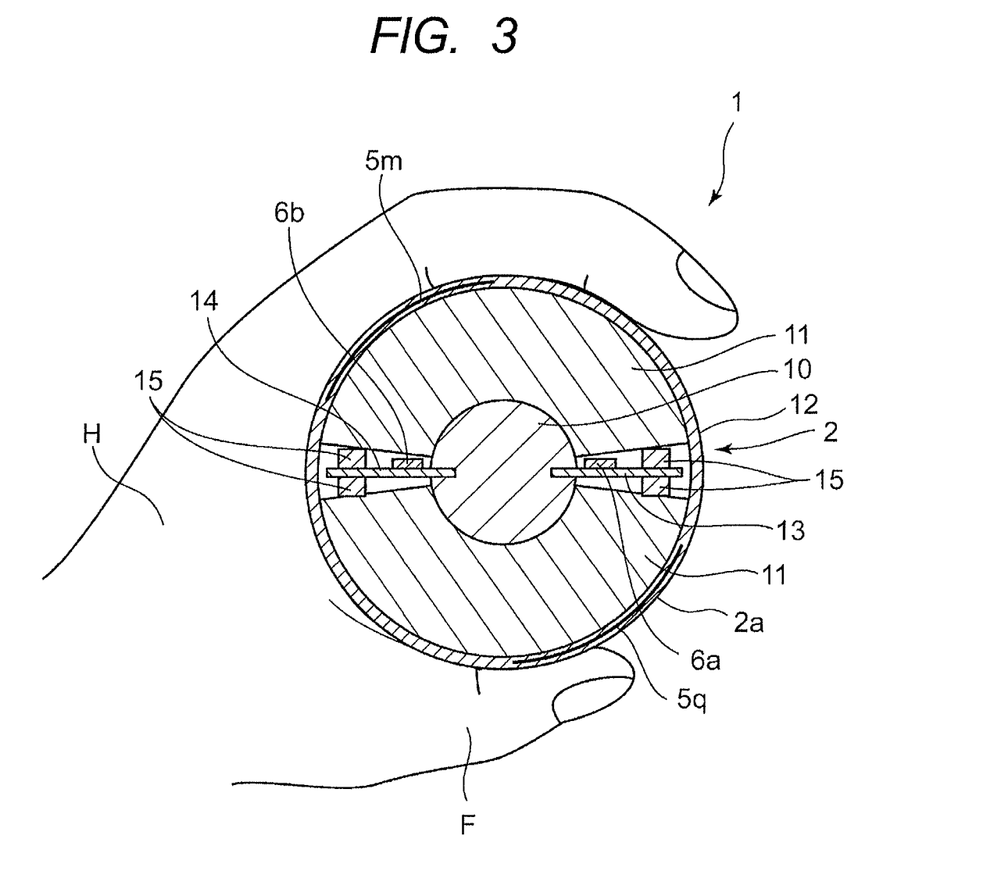
FIG. 3 is an enlarged longitudinal cross-sectional view taken along line A-A as viewed from an arrow direction in FIG. 2.

FIG. 3 is an enlarged longitudinal cross-sectional view taken along line A-A as viewed from an arrow direction in FIG. 2. Although the longitudinal cross-section of FIG. 3 is a portion represented by the second sensor members 6a and 6b, the second sensor members 6c and 6d shown in FIG. 1 have a cross-sectional portion configured by the same longitudinal cross-section as FIG. 3.

The ring portion (operation body) 2 shown in FIG. 3 has a central shaft 10 at a substantial center thereof. The central shaft 10 is a cored bar of and forms the framework of a steering wheel. The central shaft 10 is provided along the line D (see FIG. 1) of the ring portion 2. An internal layer 11, which is made of resin or the like, is provided around the central shaft (cored bar) 10. The internal layer 11 represented as the longitudinal cross-section of FIG. 3 has a circular outer peripheral surface. Furthermore, a skin layer 12 is provided around the outside of the internal layer 11. The skin layer 12 has a configuration in which leather is provided on an outer peripheral surface of an elastic member made of rubber or the like for example.

The internal layer 11 is configured as a movable portion. For example, the internal layer 11 is movable depending on deformation with respect to a twist operation described later. Alternatively, the entirety of the internal layer 11 may not be configured as a movable portion. That is, the internal layer 11 may be made in such a manner that at least a portion of the internal layer 11 is configured as a movable portion, and results in deformation with respect to the second sensor members 6.

As shown in FIG. 3, protrusion portions 13 and 14, which are installation portions of the second sensor members 6, are provided toward the skin layer 12 around the outside of the central shaft 10. The protrusion portions 13 and 14 are provided toward the skin layer 12 at opposite sides of the central shaft 10 in the longitudinal cross-section of FIG. 3, respectively.

As shown in FIG. 3, a predetermined interval is spaced between each of the protrusion portions 13 and 14 and the internal layer 11, and the protrusion portions 13 and 14 face the internal layer 11. Return rubbers 15 are interposed between the respective protrusion portions 13 and 14 and the internal layer 11. In this case, if an interval between each of the protrusion portions 13 and 14 and the internal layer 11 extends in proportion to a distance from the cored bar, operability is good due to the extension of a movable region.

As shown in FIG. 3, the second sensor members 6a and 6b are installed on surfaces (surfaces facing the internal layer 11) of the respective protrusion portions 13 and 14 further inside than the return rubbers 15 toward the central shaft 10. The protrusion portions 13 and 14 function as the installation portions of the second sensor members 6a and 6b.

As shown in FIG. 3, the first sensor member 5m is provided between the internal layer 11 and the skin layer 12. The first sensor member 5m is stuck on a surface of the internal layer 11, a back surface of the skin layer 12, or both of the surface of the internal layer 11 and the back surface of the skin layer 12. Each of the first sensor members 5a to 5p shown in FIG. 1 is disposed similar to the first sensor member 5m.

In the longitudinal cross-section shown in FIG. 3, the plural first sensor members 5m and 5q are disposed to be spaced with an interval in the cross-section circumferential direction. Three or more first sensor members 5 may also be provided in the cross-section circumferential direction of FIG. 3.

The steering device 1 including the input device in the embodiment first acquires the operation position information by the first sensor member 5i when a hand H comes into contact with or approaches on the operation surface 2a of the ring portion 2, as shown in FIG. 1, and then acquires the twist information by the second sensor members 6 when the operation surface 2a of the ring portion 2 is twist-operated along the cross-section circumferential direction of the operation surface 2a in an arrow B direction or an arrow C direction, as shown in FIG. 2.

In FIG. 1, the hand H is placed at a position facing the first sensor member 5i. The first sensor member 5i is a capacitive sensor, and may detect a contact or proximity position of the hand H through a capacitance change (here, proximity refers to a state in which the hand H approaches on but is not in contact with the operation surface 2a).

In this case, when the first sensor members 5m and 5q are plurally provided to be spaced with an interval in the cross-section circumferential direction as in FIG. 3, it may be possible to obtain good operability due to a reduction in operation error. This point will be described using FIG. 3.

FIG. 3 does not illustrate a state in which the hand H is placed at a position facing the first sensor member 5i shown in FIG. 1 (the first sensor member shown in FIG. 3 is denoted by reference numeral 5m). However, since the arrangement relations of the first sensor members 5 are the same at all positions in the cross-section circumferential direction, the first sensor members 5 will be described using FIG. 3.

As shown in FIG. 3, the operation surface 2a of the ring portion 2 is grasped by the hand H. In this case, since the plural first sensor members 5m and 5q are disposed in the cross-section circumferential direction, the contact or proximity of the hand H may be detected by both of the first sensor member 5m and the first sensor member 5q. However, there is a case where the contact or proximity of the hand H may not be detected by the first sensor member 5m because, for example, the wrist side of the hand H is separated from the operation surface 2a. On the other hand, in this case, a finger F is in a state of being in contact with the operation surface 2a, and thus the first sensor member 5q close to the finger F may detect the contact of the hand H or at least proximity of the hand H. In contrast thereto, there is a case of being detected at the wrist side but being not detected at the finger side. As such, even in a state of loosely grasping the ring portion 2 with the hand H, the contact or proximity of the hand H may be detected, thereby enabling a reduction in operation error.

In FIG. 1, the contact or proximity of the hand H is detected by the first sensor member 5i; however, for example, there is a case where the contact or proximity of the hand H is detected over the plural first sensor members 5. For example, when the hand H comes into contact with the first sensor member 5i and the first sensor member 5j located adjacent thereto, the presence of the hand H is detected by both of the first sensor member 5i and the first sensor member 5j. In this case, it may be possible to determine which position the hand H is at or where the hand H is close, by comparing the detected result of the first sensor member 5i with the detected result of the first sensor member 5j.

The configuration of the capacitive sensor configuring each first sensor member 5 is not limited. The configuration is sufficient if able to detect an operation position. Here, the operation position refers to an X-Y coordinate position in each first sensor member 5 besides a position of the first sensor member 5 itself. In addition, the embodiment may have a configuration which may detect a position of each first sensor member 5 as an operation position based on the detected result of the first sensor member 5.

For example, if each first sensor member 5 has an electrode structure of a simple flat plate shape, it may be possible to detect which of the first sensor members 5 the hand H is close to by the detected result of each first sensor member 5. Alternatively, if a plurality of electrodes of which each has a linear shape is arranged on the plane to be in parallel with or to intersect with each other, it may be possible to detect the X-Y coordinates in the first sensor member 5 facing the hand H.

Figure 6:
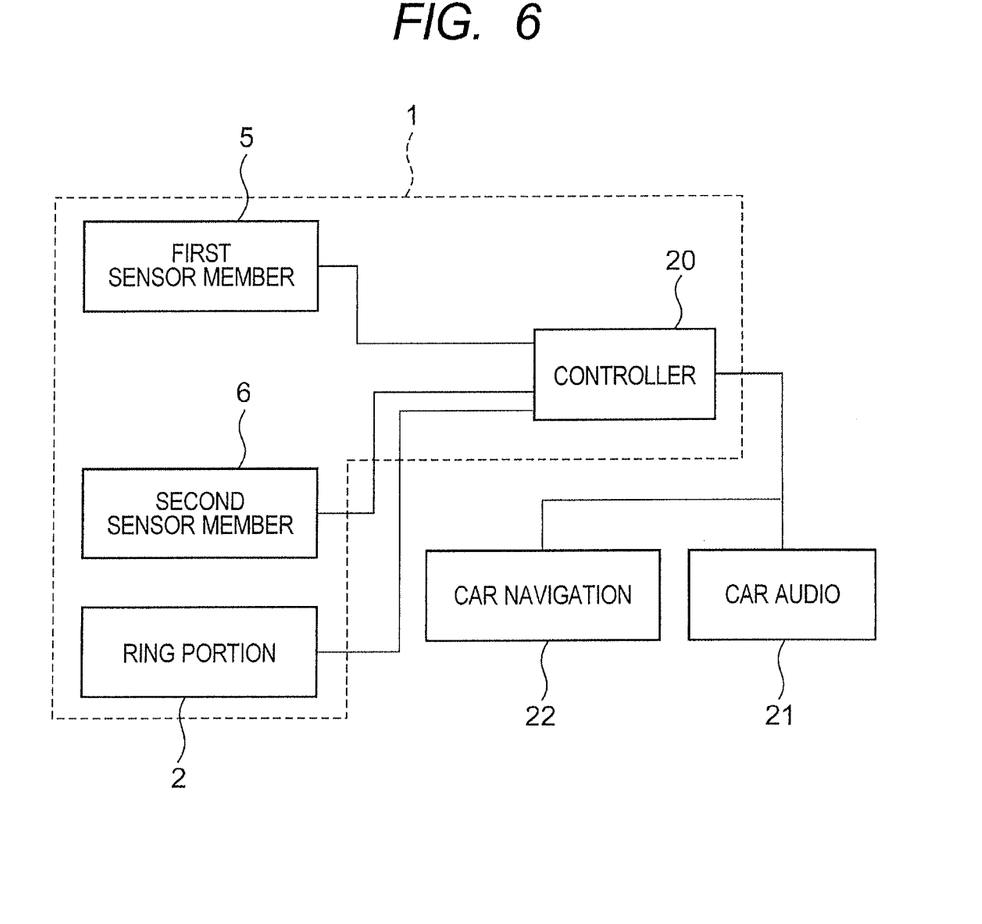
FIG. 6 is a block diagram illustrating the steering device and a control system of an in-vehicle device including the steering device according to the embodiment.

FIG. 6 illustrates a block diagram of the steering device 1 and a block diagram of a control system of the in-vehicle device including the steering device 1 in the embodiment.

As shown in FIG. 6, the steering device 1 includes the first sensor members 5, the second sensor members 6, and a controller 20. Each first sensor member 5 is electrically connected to the controller 20. Each first sensor member 5 may be individually connected to the controller 20, and also be connected to the controller 20 in a state of configuring an electric circuit such as a half bridge circuit or a full bridge circuit between the plural first sensor members 5. In any case, it is preferable if each first sensor member 5 is able to acquire the operation position information at the operation position on the operation surface 2a based on an electric change of the first sensor member 5. The capacitance of the first sensor member 5i is changed when the hand H comes into contact with the operation surface 2a of the ring portion 2 shown in FIG. 1, and the controller 20 outputs the operation position information (detection signal) based on the capacitance change detected by the first sensor member 5i.

As shown in FIG. 6, a plurality of in-vehicle devices is electrically connected to the controller 20. For example, a car audio device 21 and a car navigation device 22 are connected to the controller 20. Otherwise, various in-vehicle devices such as a power window and a reclining control device may be connected to the controller, but these are omitted here. In any case, the embodiment is not limited to the in-vehicle devices (electronic devices) connected to the steering device 1.

For example, a volume mode or a musical selection mode of the car audio device 21 may be selected based on the operation position information output from the above controller 20. Also, the in-vehicle device itself may be selected based on the operation position information output from the controller 20. That is, the car navigation device 22 may be selected and activated by the hand H coming into contact with or approaching on the operation surface 2a of the ring portion 2 shown in FIG. 1. As such, by detecting the operation position on the operation surface 2a of the ring portion 2 by the first sensor members 5, it may be possible to select the in-vehicle device, the function (mode) of the in-vehicle device, or the in-vehicle device and the function (mode) thereof.

In the front view of FIG. 1, the plural first sensor members 5 are arranged to be spaced with an interval in the circumferential direction of the ring portion 2. When the grasped position of the ring portion 2 is changed, the controller 20 may output operation position information from the other first sensor members 5, any thus it may be possible to perform a selection other than the selection which may be obtained by the grasped position of FIG. 1. A function of selecting only the number of the first sensor members 5 may be given, or a function of selecting the plural first sensor members 5 as pairs may also be given.

In addition, a decoration may be provided on the operation surface 2a, a light irradiation portion such as an LED may be used, or a selection region of the in-vehicle device or a selection region of the function (mode) thereof may be displayed on the operation surface 2a as a touch panel. In addition, a function (mode) depending on the operation position of the hand H may also be displayed on each display device mounted in the vehicle.

As shown in FIG. 2, the twist operation of the ring portion 2 is performed in the arrow B or C direction after the selection of the in-vehicle device or the selection of the function (mode) thereof. In this case, the twist operation is performed as is without changing the operation position and when the in-vehicle device is selected or the function (mode) thereof is the selection. In the embodiment illustrated in FIG. 2, the second sensor members 6a to 6d to detect the twist operation are arranged at predetermined positions. Therefore, the operation surface 2a inside which the second sensor members 6a to 6d are disposed is twisted in the cross-section circumferential direction (see FIG. 3). It is preferable that a decoration be provided on the operation surface 2a, a light irradiation portion such as an LED be used, or a twist operation position be displayed on the operation surface 2a as a touch panel. In addition, these may also be displayed on each display device mounted in the vehicle. Although the twist operation with only the right hand is performed in FIG. 2, the twist operation may also be performed with only the left hand, or with the left hand together with the right hand. However, the twist operation with the right hand shown in FIG. 2 will be described using FIG. 3 below.

FIG. 3 shows a reference state in which the twist operation of the operation surface 2a is not performed in the cross-section circumferential direction thereof. When the twist operation is performed in the first twist direction B as FIGS. 2 and 4 from the reference state of FIG. 3, the skin layer 12 and the internal layer 11 which is the movable portion are movable in first twist direction B. The internal layer 11 or the skin layer 12 is made of a material which may be twisted to a certain extent, and thus the twist operation is possible. In addition, the internal layer 11 or the skin layer 12 is made of a hard material, and may rotate about the central shaft (cored bar) in the circumferential direction according to the twist operation. On the other hand, each of the central shaft (cored bar) 10 and the protrusion portions 13 and 14 is formed as a fixing portion which is not moved even by the twist operation.

Figure 4:
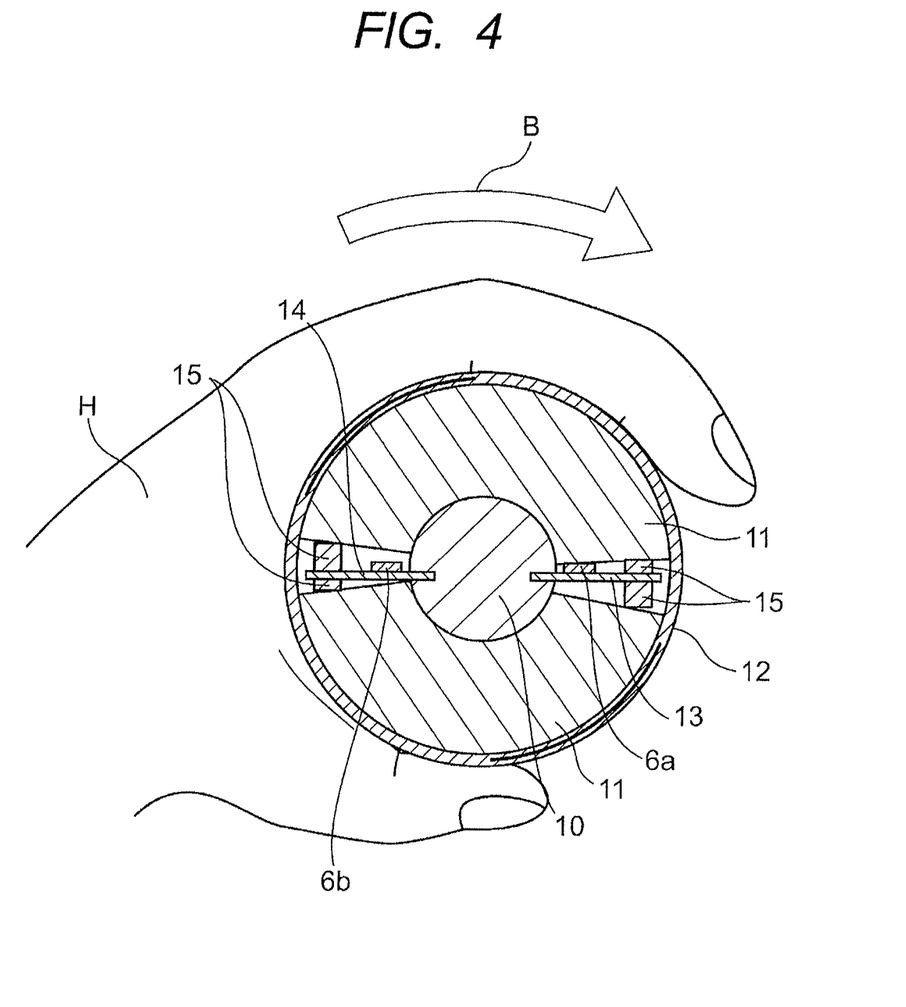
FIG. 4 is an enlarged longitudinal cross-sectional view when the ring portion is twist-operated in a first twist direction B from the state of FIG. 3.

The internal layer 11 is movable in the first twist direction B by the twist operation in the first twist direction B shown in FIG. 4, and the second sensor member 6a which is installed on the protrusion portion 13 is pressed against the internal layer 11 and deformed depending on the movement thereof. Accordingly, the second sensor member 6a generates an electric change. On the other hand, the internal layer 11 is placed in a direction separated from the second sensor member 6b which is located opposite the second sensor member 6a through the central shaft 10, or the internal layer 11 does not approach at least the second sensor member 6b. Consequently, the second sensor member 6b is not deformed. Accordingly, the second sensor member 6b is not electrically changed. In this case, the protrusion portion 13 is configured as a flexible substrate, and the protrusion portion 13 and the second sensor member 6a may also be deformed together.

Each of the second sensor members 6 is a strain sensor (strain gauge) or a pressure sensitive sensor (pressure sensor). For example, if the second sensor member 6 is a strain sensor, a resistance value is changed depending on the deformation. In addition, the pressure sensitive sensor is, for example, a MEMS sensor, and a capacitance change or a voltage change and a resistance change are entailed depending on the deformation. The sensor structure is not specified.

In the embodiment, for example, a bridge circuit is configured by the second sensor member 6a and the second sensor member 6b to be electrically connected to the controller 20 shown in FIG. 6. Each second sensor member 6 may also be electrically connected individually to the controller 20.

The controller 20 outputs twist information based on the electric change of the second sensor member 6. Here, the term "twist information" refers to a detection signal such as a twist amount or a twist operation speed.

As above, for example, the volume mode of the car audio device 21 is selected by the operation position information by the first sensor members 5. Thus, when the twist information (detection signal) is output from the controller 20 to the car audio device 21, the volume is turned up or the increase speed is controlled based on the twist information.

Figure 5:
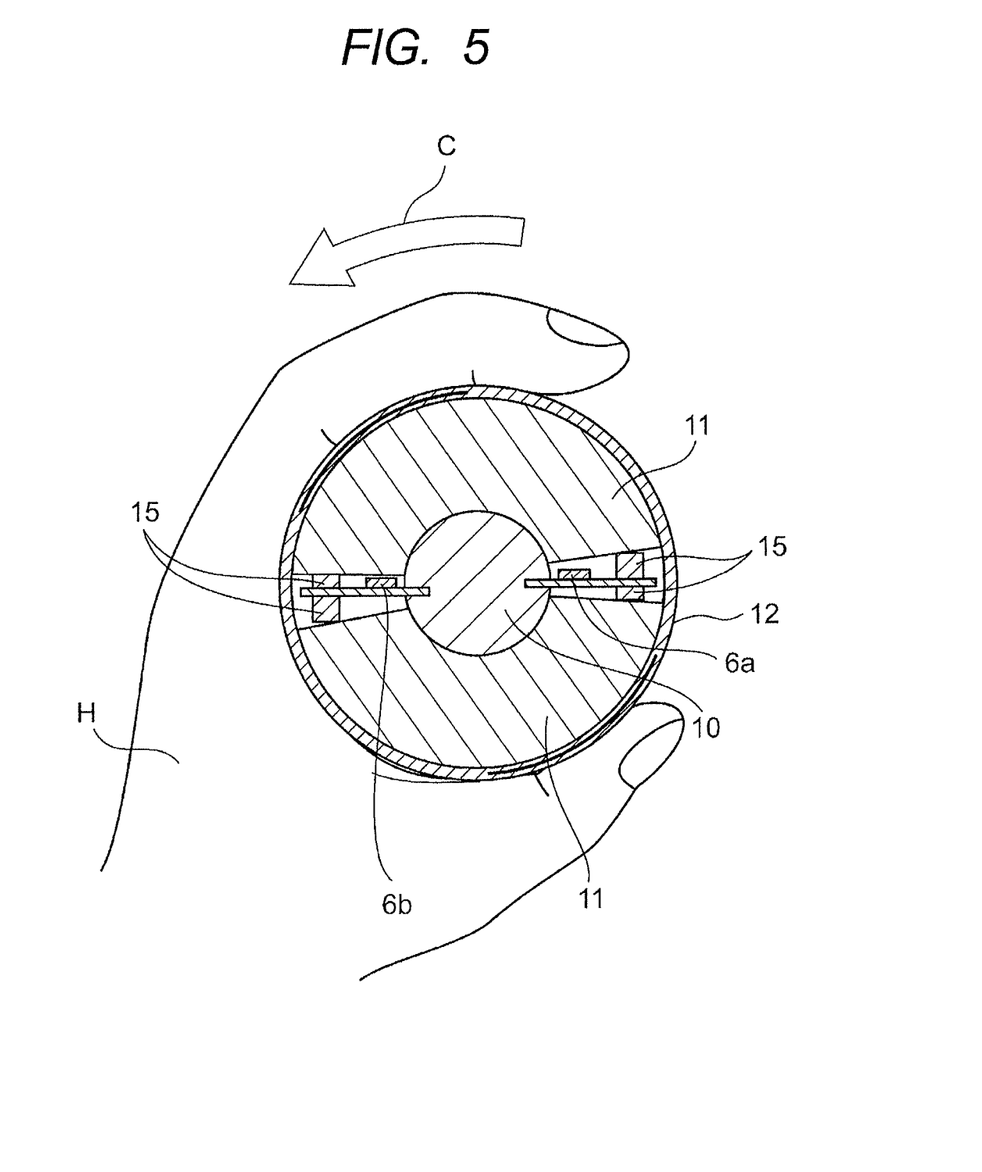
FIG. 5 is an enlarged longitudinal cross-sectional view when the ring portion is twist-operated in a second twist direction C opposite to the first twist direction B from the state of FIG. 3.

When the hand H is separated from a state of FIG. 5, the state returns to the reference state of FIG. 3 by the return rubbers 15. In this case, the second sensor member 6a returns to an original state of FIG. 3, and the output of the second sensor member 6a also returns to a reference value. However, the volume may be controlled so as to be maintained as is in a state of being turned up.

In order to turn down the volume, the twist operation is performed in the second twist direction C opposite to the first twist direction B, as shown in FIG. 5 for example. Thereupon, the second sensor member 6b is deformed depending on the movement of the internal layer 11 to generate an electric change of the second sensor member 6b. The controller 20 may turn down the volume or control the decrease speed by transmitting the twist information to the car audio device 21 based on the electric change.

In this embodiment, it may be possible to obtain both of the operation position information based on the electric change of each first sensor member 5 and the twist information based on the electric change of each second sensor member 6. For example, it may be possible to select a specific function of the in-vehicle device (electronic device) based on the operation position information and execute a selected input operation of the in-vehicle device (electronic device) based on the twist information. Particularly, in the embodiment, the in-vehicle device may be activated by simple operations such as the contact with or proximity to the operation surface 2a and the twist thereof, thereby enabling an improvement of operability. In addition, the in-vehicle device (electronic device) may be controlled so as not to be activated only in such a manner that the first sensor member acquires the operation position information by only the hand H coming into contact with or approaching on the operation surface 2a, and may be controlled so as to be first activated by adding the twist operation. Consequently, it may be possible to prevent an operation error.

In the embodiment, the in-vehicle device may be controlled so as not to be activated if the twist operation is not performed with respect to all functions of the in-vehicle device, or may be controlled so as to add the twist operation only with respect to a partial function thereof. For example, the twist operation may be controlled so as to be added only with respect to a specific function such as a volume mode, and a play-back mode, a stop mode, and the like in the car audio device may also be activated only by the operation position information by the first sensor members 5.

As shown in FIG. 1 and the like, the first sensor members 5 and the second sensor members 6 are disposed only in the ring portion 2, and are not disposed in the spoke portions 4 and the like. In the embodiment, it may be possible to complete the input operation to the in-vehicle device only by the operation on the ring portion 2, without a need to provide the spoke portions 4 with a switch function and the like. As such, although it is preferable that the input operation be completed only by the ring portion 2, a sensor member as an operation body of the input device may be disposed even in the spoke portions 4 in conjunction with the ring portion 2.

As shown in FIGS. 4 and 5, the embodiment includes the second sensor member 6a which is deformed by the twist operation in the first twist direction B and the second sensor member 6b which is deformed by the twist operation in the second twist direction C, thereby being able to acquire both of the twist information in the first twist direction B and the twist information in the second twist direction C. Accordingly, it may be possible to perform a separate input operation with respect to the in-vehicle device by the twist operation directions B and C, and realize the input device having a simple structure in which many input actions may be performed.

The embodiment may have a configuration in which the protrusion portions 13 and 14 are provided toward the skin layer 12 with interposing the central shaft 10 therebetween, each of the protrusion portions 13 and 14 is an installation portion of each second sensor member 6, and the second sensor member 6 is installed on the side of each of the protrusion portions 13 and 14 facing the internal layer (movable portion) 11. Alternatively, the embodiment may have a configuration in which the protrusion portions are provided to be interposed between the movable portions, and each second sensor member is installed on a surface facing each movable portion. The embodiment shown in FIGS. 3 to 5 includes the above-mentioned two configurations.

The ring portion 2 of the embodiment includes the central shaft (cored bar) 10 which is a fixing side at the time of the twist operation, the internal layer 11 which is provided around the central shaft 10 and of which at least a portion is a movable portion, and the skin layer 12 provided on the outer peripheral surface of the internal layer 11. The central shaft 10 is provided with the protrusion portions 13 and 14 which are the installation portions at the positions facing the internal layer (movable portion) 11, the second sensor members 6a and 6b (6c and 6d) are installed on the sides of the protrusion portions 13 and 14 facing the internal layer (movable portion) 11. By this internal structure, the internal layer (movable portion) 11 may be smoothly moved at the time of the twist operation, the second sensor members 6 may be properly deformed at the time of the movement, and the twist information having high accuracy may be obtained.

If the internal layers 11 and 11, which are located upward and downward with interposing the protrusion portions 13 and 14 shown in FIG. 3 therebetween, are respectively configured as the movable portions, the second sensor members 6a and 6b (6c and 6d) may be respectively disposed on both surfaces of one protrusion portion 13 (or 14).

In the embodiment, the first sensor members 5 are arranged between the internal layer 11 and the skin layer 12, and thus the operation position information may be properly acquired by the first sensor members 5. In particular, by arranging the first sensor members 5 on the back surface of the skin layer 12, the sensor sensitivity of the first sensor members 5 may be enhanced, and the operation position information having high accuracy may be acquired.

As shown in FIG. 3 and the like, the plural first sensor members 5 are arranged to be spaced with an interval in the cross-section circumferential direction, and thus it may be possible to properly acquire the operation position information regardless of grasp method and the like, and obtain good operability.

The first sensor members 5 and the second sensor members 6 are installed within the same range as the line D (see FIG. 1) of the ring portion 2. That is, as shown in FIG. 1, the second sensor members 6a to 6d are arranged within the circumferential region in which each of the first sensor members 5a to 5p from the first sensor member 5a to the first sensor member 5p is disposed. Accordingly, after the hand H comes into contact with or approaches on the operation surface 2a in order to acquire the operation position information by the first sensor members 5, the shift to the twist operation may be smoothly performed. Consequently, it may be possible to obtain good operability.

Figure 7:
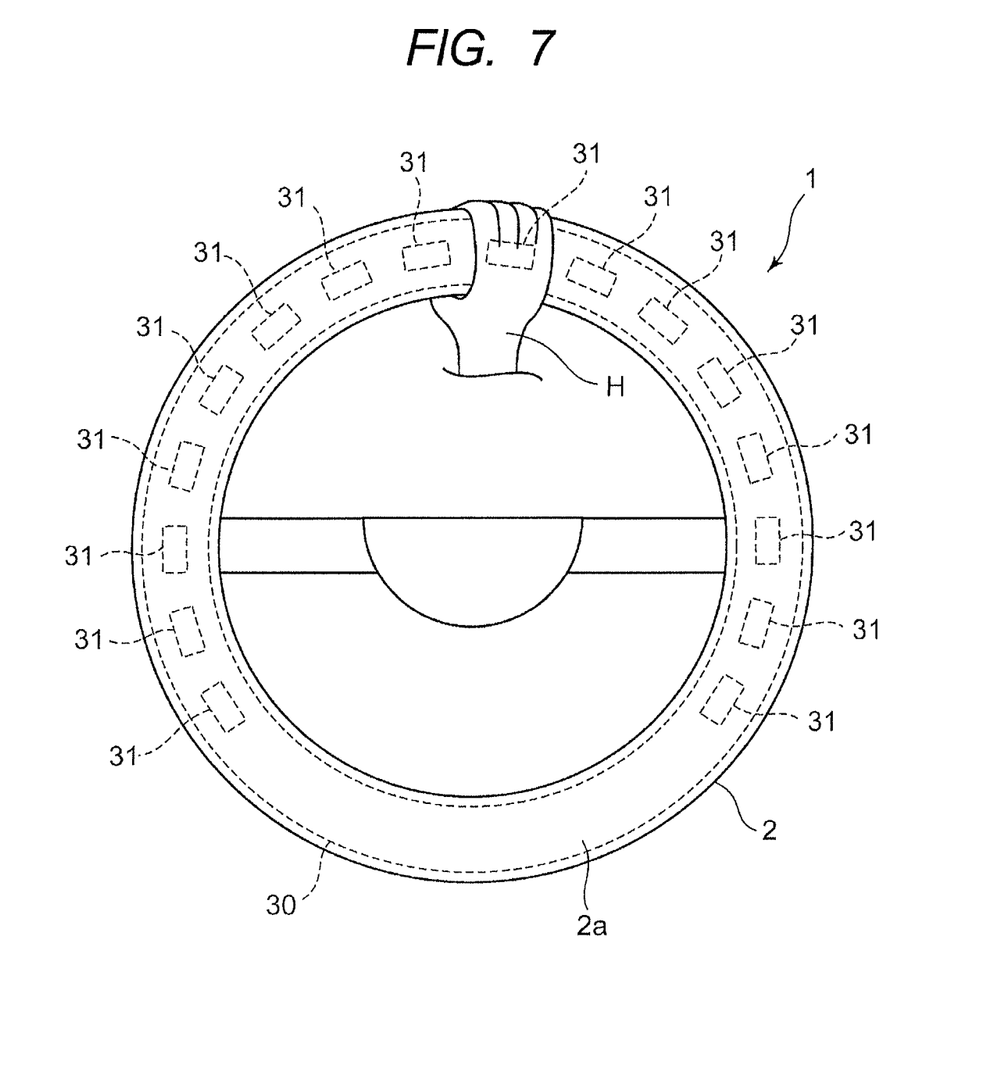
FIG. 7 is a front view of a steering device having a configuration different from FIG. 1 according to an embodiment.

The arrangement of the first sensor members 5 and the second sensor members 6 shown in FIG. 1 is an example. For example, first sensor members 30 may be arranged throughout a region of the ring portion 2 in the circumferential direction thereof as shown in FIG. 7. In this case, the first sensor members 30 may continue throughout the circumference as shown in FIG. 7, or may also discontinue at a portion of the circumference.

In addition, second sensor members 31 may also be arranged throughout the circumference of the ring portion 2, or over a partial region of the circumference. In FIG. 2, the plural second sensor members 31 are arranged over the circumferential direction of the ring portion 2.

In the configuration of the steering device shown in FIGS. 1 and 2, after the hand H grasps the operation surface 2a of the ring portion 2 at the position shown in FIG. 1, the twist operation of the ring portion 2 should be performed by changing the position of the hand H as shown in FIG. 2. However, by arranging the second sensor members 31 along the circumferential direction of the ring portion 2 as shown in FIG. 7, the twist information may be obtained from the second sensor members 31, for example, in such a manner that after the operation position information is obtained by the first sensor members 30 by grasping the operation surface 2a of the ring portion 2 with the hand H, the ring portion 2 is twist-operated at a position in which the hand H is not removed from the ring portion 2. Consequently, it may be possible to perform safer driving.

Figure 8:
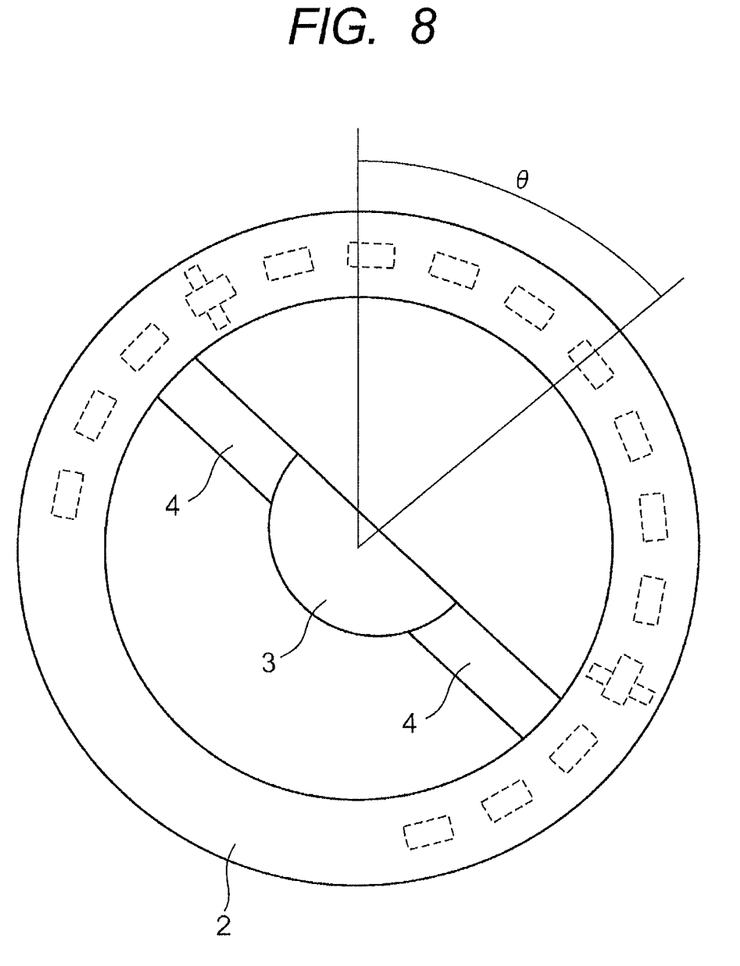
FIG. 8 is a front view illustrating a state in which the ring portion of the steering device shown in FIG. 1 is rotated to be inclined.

FIG. 8 is a front view illustrating a state in which the ring portion 2 is inclined from the state of FIG. 1 in a clockwise direction by an angle θ. When the ring portion 2 is inclined by a predetermined angle or more at the time of turning right or left, it is preferable to control the operation position information or the twist information so as not to be output from the controller 20 to the in-vehicle devices (electronic devices) 21 and 22 shown in FIG. 6. As shown in FIG. 6, the controller 20 transmits angle information of the ring portion 2, which is detected by a steering angle sensor (not shown), to the in-vehicle devices (electronic devices) 21 and 22 together with the operation position information or the twist information, and the in-vehicle devices may be controlled so as not to be activated by invalidating the operation position information or the twist information based on the angle information.

Accordingly, it may be possible to prevent a sudden input operation to the in-vehicle device at the time of turning right or left and the like from being executed.

Although the input device in the embodiment is suited to the steering device 1, the input device may be applied to various input devices such as a game machine regardless of the steering device 1.

Figure 9:
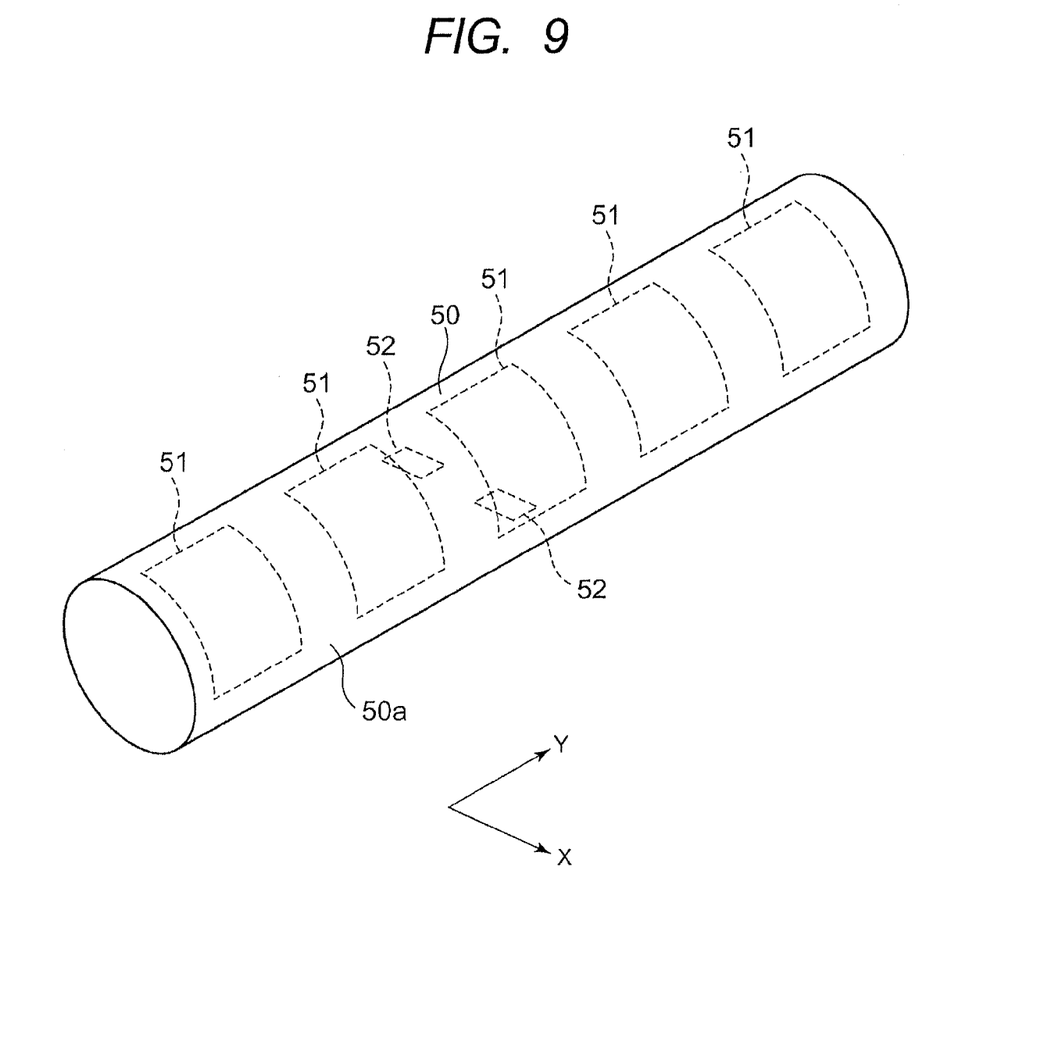
FIG. 9 is a perspective view of an input device according to another embodiment.

For example, as shown in FIG. 9, a plurality of first sensor members 51 is arranged within a bar-shaped operation body 50 to be spaced with an interval in the longitudinal direction (Y), and second sensor members 52 are disposed within the operation body 50. The first sensor members 51 are to detect a position of a hand which comes into contact with or approaches on an outer peripheral surface (operation surface) 50a of the operation body 50, and operation position information is output from the controller (see FIG. 6) based on an electric change of each first sensor member 51. In addition, the operation body 50 of FIG. 9 may be twisted in the cross-section circumferential direction of the outer peripheral surface 50a which is represented by being cut in the thickness direction along the width direction (X), and the second sensor members 52 are to detect a twist operation. Twist information is output from the controller (see FIG. 6) based on an electric change of each second sensor member 52. The internal structure of the operation body 50 may apply a separate structure which may also be a structure corresponding to FIG. 3.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
   an operation body of which an outer peripheral surface is used as an operation surface, the operation body being twist-operated in a cross-section circumferential direction thereof;
   first sensor members, each configured to detect operation position information on the operation surface by detecting an electric change;
   second sensor members, each configured to detect twist information by detecting an electric change when the twist operation is performed; and
   a controller to output the operation position information and the twist information in order to control activation of an electronic device and
   wherein the operation body includes movable portions which are movable by the twist operation in the cross-section circumferential direction and an installation portion which faces each of the movable portions to install the second sensor member, the second sensor member is deformed depending on the movement of the movable portion, and the twist information is detected based on the electric change of the second sensor member depending on the deformation.

2. The input device according to claim 1,
   wherein the second sensor member is provided to be deformed by a twist operation in a first twist direction, and the second sensor member is provided to be deformed by a twist operation in a second twist direction opposite to the first twist direction.

3. The input device according to claim 1,
   wherein the operation body is provided therein with a central shaft which is a fixing portion unmovable by the twist operation, the movable portion is provided in at least a portion of the periphery of the central shaft, the central shaft is provided with a protrusion portion which is the installation portion at a position facing the movable portion, and the second sensor member is installed on a side of the protrusion portion facing the movable portion.

4. The input device according to claim 3,
   wherein the protrusion portions are provided toward the outer peripheral surface at both sides of the operation body with interposing the central shaft between the protrusion portions, the respective protrusion portions are the installation portions, and the second sensor members are respectively installed on the sides of the respective protrusion portions facing the movable portions.

5. The input device according to claim 3,
   wherein the protrusion portion is provided to be interposed between the movable portions, and each of the second sensor members is installed on a surface facing each of the movable portions.

6. The input device according to claim 3,
   wherein the operation body includes the central shaft, an internal layer provided around the central shaft, and a skin layer provided around the internal layer, at least a portion of the internal layer is the movable portion, an outer peripheral surface of the skin layer is the operation surface, and the first sensor member is provided between the skin layer and the internal layer.

7. The input device according to claim 6,
   wherein the plural first sensor members are spaced with an interval in the cross-section circumferential direction.

8. The input device according to claim 1,
   wherein the operation body has a length in a cross-section depth direction thereof, and the plural first sensor members are spaced with an interval in a longitudinal direction of the operation body.

9. The input device according to claim 1,
   wherein the first sensor member and the second sensor member are provided within the same range as a longitudinal direction of the operation body.

10. The input device according to claim 1,
    wherein the first sensor member comprises a capacitive sensor.

11. The input device according to claim 1,
    wherein the second sensor member comprises one of a strain sensor or a pressure sensitive sensor.

12. The input device according to claim 1,
    wherein the operation body comprises a grasp portion which configures a steering device of a vehicle during steering.

13. The input device according to claim 12,
    wherein when the grasp portion of the steering device is inclined by a predetermined angle or more, the output from the controller is invalidated.

14. The input device according to claim 12,
    wherein the grasp portion comprises a ring portion, and the input device is configured along a circumferential direction of the ring portion.

15. The input device according to claim 14,
    wherein the plural first sensor members are spaced with an interval along the circumferential direction of the ring portion.

16. The input device according to claim 11,
    wherein the second sensor member is provided at a portion grasped with a right hand, a portion grasped with a left hand, or a portion grasped with the right hand and the left hand.

17. A control system of an in-vehicle device including:
    an input device comprising:
    an operation body of which an outer peripheral surface is used as an operation surface, the operation body being twist-operated in a cross-section circumferential direction thereof;
    first sensor members, each configured to detect operation position information on the operation surface by detecting an electric change;

second sensor members, each configured to detect twist information by detecting an electric change when the twist operation is performed; and a controller to output the operation position information and the twist information in order to control activation of an electronic device; and wherein the operation body comprises a grasp portion which configures a steering device of a vehicle during steering;

wherein the control system is configured to:

select the in-vehicle device, a function of the in-vehicle device, or the in-vehicle device and the function thereof based on the operation position information;

execute a selected input operation to the in-vehicle device based on the twist information; and activate the in-vehicle device.

18. The control system of an in-vehicle device according to claim 17, wherein when the grasp portion of the steering device is inclined by a predetermined angle or more, the in-vehicle device is not activated.

\* \* \* \* \*